United States Patent
Meyer et al.

(10) Patent No.: US 6,304,004 B1
(45) Date of Patent: Oct. 16, 2001

(54) APPARATUS FOR ACTUATING A PASSENGER SAFETY SYSTEM

(75) Inventors: Michael Meyer; Frank Zerrweck, both of Altdorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/348,045

(22) Filed: Jul. 6, 1999

(30) Foreign Application Priority Data

Jul. 3, 1998 (DE) ............................................... 198 29 756

(51) Int. Cl.[7] .................................................. B60R 21/02
(52) U.S. Cl. ..................... 307/10.1; 180/271; 280/735; 296/68.1; 701/45
(58) Field of Search ........................ 307/10.1; 180/271, 180/274, 282; 280/728.1, 735; 340/436; 701/45; 296/68.1

(56) References Cited

U.S. PATENT DOCUMENTS

| | | | |
|---|---|---|---|
| 4,324,753 | 4/1982 | Gill | 264/121 |
| 5,109,341 | * 4/1992 | Blackburn et al. | 307/10.1 |
| 5,248,534 | 9/1993 | Rosen | 428/36.7 |
| 5,411,289 | * 5/1995 | Smith et al. | 280/728.1 |
| 5,490,069 | * 2/1996 | Gioutsos | 701/45 |
| 5,947,543 | * 9/1999 | Hubbard | 296/68.1 |

FOREIGN PATENT DOCUMENTS

| | | |
|---|---|---|
| 40 23 109 | 1/1992 | (DE) . |
| 43 24 753 | 3/1994 | (DE) . |
| 44 26 090 | 7/1995 | (DE) . |
| 196 18 161 | 7/1996 | (DE) . |
| 196 16 293 | 10/1997 | (DE) . |
| 196 19 117 | 11/1997 | (DE) . |
| 196 27 877 | 1/1998 | (DE) . |
| 196 43 013 | 12/1998 | (DE) . |
| 0 842 824 | 5/1998 | (EP) . |

* cited by examiner

*Primary Examiner*—Albert W. Paladini
(74) *Attorney, Agent, or Firm*—Crowell & Moring LLP

(57) ABSTRACT

An actuating control apparatus for the control of different passenger safety components of a passenger safety system in a motor vehicle. The actuating control apparatus can be controlled at its input at least by one deceleration sensor and includes a signal evaluation with a programmable actuating logic as well as a plurality of output stages. In case of an actuation signal, the output stages issue an actuation current to the passenger safety component that is to be controlled. The output stages are adapted in their electrical/electronic performance to the particular passenger safety component. At least one output stage is provided which by a preset electrical control signal is adaptable in its electrical/electronic performance to at least two different passenger safety components.

11 Claims, 1 Drawing Sheet

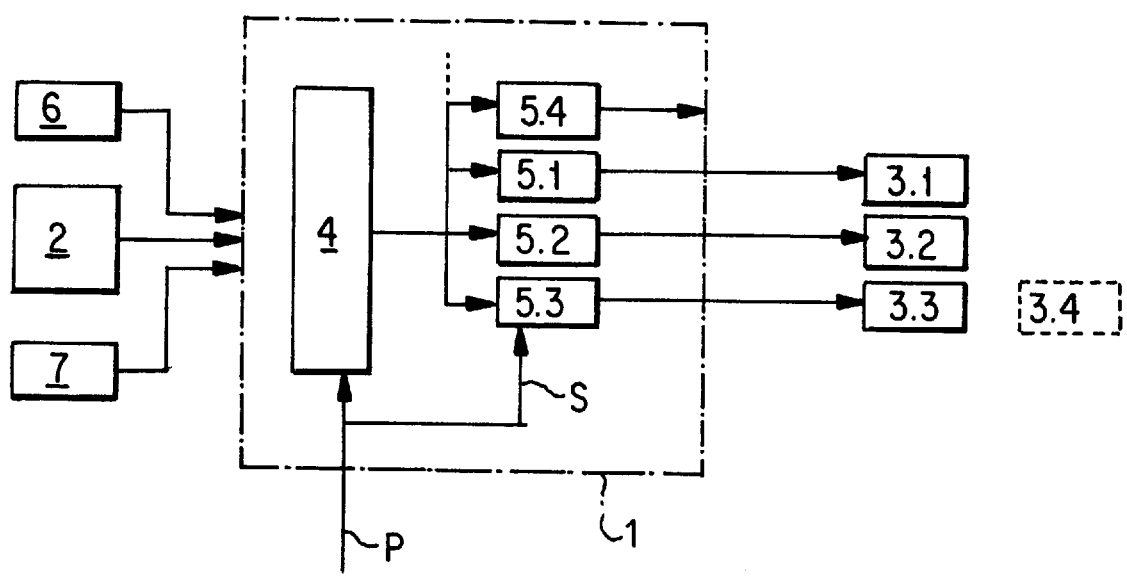
Figure

APPARATUS FOR ACTUATING A PASSENGER SAFETY SYSTEM

BACKGROUND AND SUMMARY OF THE INVENTION

This application claims the priority of German patent 198 29 756.4, filed Jul. 3, 1998, the disclosure of which is expressly incorporated by reference herein.

The invention relates to an apparatus for the actuation of a passenger safety system in a motor vehicle which is controllable at the input side at least by a deceleration sensor and comprises a signal evaluation with a programmable actuation logic as well as a plurality of output stages which in the event of actuation issue a firing current to the particular passenger safety components that are to be actuated and are adapted in their electrical/electronic performance to the particular passenger safety component. The invention also relates to a method for adapting such an actuation control apparatus to the existing components of a passenger safety system of a vehicle.

Various models of vehicles are equipped with different passenger safety systems and corresponding actuation control apparatus. There are vehicles with belt tighteners, airbags on the driver and passenger side, deployable roll bars, side air bags, window bags, knee bags and back seat air bags. Usually a model contains only a selection of these passenger safety components.

Different variants of equipment are provided regarding sensing devices for judging conditions relating to the passengers, such as whether seat belts are fastened, seat occupancy by a person or a child, passenger position or passenger weight etc., the state of which affects the decision to deploy, since the restraining devices are activated depending on the severity of an accident and the condition of the passengers recognized by means of a deceleration sensor (known, for example, from German patent document DE 40 23 109 A1). Thus, depending on whether the passenger is belted or not, for example, different deployment thresholds for deploying the airbag are set for the deceleration signal.

Different equipment is also available with regard to the sensing system for detecting factors relating to crash parameters. For example, an anticipatory or pre-crash sensing system may be present which detects by means of radar measurement, for example, the relative velocity of motion toward the object of a collision just before the crash event and feeds this information to the actuation control device in order to influence the decision to actuate (known, for example, from German patent document DE 44 26 090 A1). It is also known to detect crash parameters by deformation sensors disposed near the outer skin of the vehicle's body, which measure for example the rate of intrusion, so as to indicate the collision energy based on the deformation and velocity of the intrusion (known, for example, from German patent document DE 43 24 753 A1).

It is known to use for every model variant a specific control apparatus adapted to the multi-component passenger safety system and the sensing equipment on hand, but this makes stocking the equipment very expensive. To keep the many various control apparatus within bounds, there is an increasing tendency in car manufacture to install a control apparatus covering all variants and to adapt it in a one-time parametrization procedure to the desired variant (compare German patent document DE 196 18 161 C1, for example). This can be done by means of coding switches to be set manually or by entering an appropriate data set into a nonvolatile memory. Applied to an actuation control apparatus, such parametrization consists especially in informing the actuation control apparatus about which passenger safety components and which sensing equipment for detecting factors relating to the passengers and/or to the crash parameters are present in the vehicle. As a result of the parametrization the final stages provided in the actuation control apparatus are shut off from the passenger safety components not installed in the vehicle or just the tests of the final stages which recognize the absence of a module are ignored. Also, all self-testing procedures are adjusted to the specific model variant so that no unnecessary error signals will be generated due to passenger safety or sensory components that are not provided. Lastly, the conditions for actuation in the individual end stages which fire the primer capsules of the associated passenger safety components are adjusted according to the sensory components that are present.

One typical actuation control apparatus covering all variants is controlled at the input end at least by a deceleration sensor and comprises a signal evaluation with a programmable actuation logic as well as several end stages (driver stages) which, in case of actuation, send an actuation current to the passenger safety components that are to be operated in the particular case and must be present in a number corresponding to the maximum equipment. The output stages must be adapted in their design to the primer capsule or in general to the actuator of the associated passenger safety component, and especially the output stages must be able to deliver a sufficient ignition current. The term "actuator" here comprises both the primer capsule and the actuation mechanism in reversible safety systems, such as for example a reversible belt tightener.

European patent document EP 0 842 824 A1 discloses an actuation control apparatus in which each output stage forms together with a memory a module which stores activation information relating to the controlled primer capsule. For example, a threshold value of "1" is assigned to the modules for the belt tighteners and stored, and a threshold value of "2" is assigned to the modules for the airbags and stored. The default threshold values are established to depend on the sensing equipment for detecting factors relating to the passengers or to crash parameters for the purpose, for example, of setting a maximum threshold level so as to suppress the deployment of a front seat passenger airbag if that seat is unoccupied. In the case of a dangerous collision the central unit of the actuation control apparatus conveys parallelly to all modules the threshold value corresponding to the class of accident detected, e.g., "1" or "2", as controlling information. Then only those output stages are activated whose activation information or threshold value is in a predetermined relationship to the conveyed activation information or threshold. The decision whether the particular output stage is to be activated in the accident is performed therefore in the modules themselves, not centrally. The central unit and the interface to the output stages are thus unburdened by the parallel decision making. A disadvantageous high interface frequency can thus be avoided and nevertheless rapid activation is made possible. Even if the activation information stored in the module can be flexibly established, it is however also referred to the associated output stage, which in turn is adapted to a fixedly associated safety component.

German patent document DE 196 27 877 A1 discloses an activation control apparatus with a safety condenser (autarchic condenser), which in the event of a failure of the on-board wiring can simultaneously provide the actuation energy for the activation of several safety components. The activation current of each actuator is pulse-width modulated such that the firing energy required for the particular actuator is established through the pulse-pause ratio of the activation current. Thus in comparison with the state of the art, where a separate autarchic condenser is used for each output stage, a saving is achieved because with the one autarchic condenser several actuators can be supplied simultaneously.

In a generic control apparatus comprising all equipment variants, output stages for passenger safety components not incorporated in the vehicle remain unused and the corresponding terminals are not occupied. This is unavoidable, as a rule, because many components, such as the deployable roll bar and rear-seat airbags are hardly ever present together in the same vehicle. In view of the rapidly improving availability of various passenger safety components the range of different passenger safety components that have to be covered is becoming ever greater, and this contributes to the fact that the percentage of output stages constructed in an actuation control apparatus but not needed also becomes constantly greater.

It is the object of the invention to devise an actuation control apparatus which can be used for a series of equipment variants of passenger safety components, while reducing the expense in comparison to known actuation controls.

This and other objects have been achieved according to the present invention by providing actuation control apparatus for controlling a plurality of different passenger safety components in a motor vehicle, comprising: a signal evaluation stage receiving input signals from at least a deceleration sensor, a plurality of output stages receiving signals from said signal evaluation stage, each of said output stages being electrically coupled with a respective actuator of a respective one of said passenger safety components, each of said output stages being adapted to provide an appropriate electrical signal to said respective actuator, at least one of said output stages being adaptable to provide an appropriate electrical signal to any one of at least two different ones of said passenger safety components, said at least one adaptable output stage being presettable to a selected one of said at least two different passenger safety components via an electrical control signal.

This and other objects have been achieved according to the present invention by providing a method for adapting the actuation control apparatus to the passenger safety system of a particular vehicle, wherein during a parametrization procedure, in which the actuation control apparatus is adapted to the specific ones of said passenger safety components present in said particular vehicle, the control signal is set in such a manner that the at least one adaptable output stage is adapted to the passenger safety component designed for adaptation and actually present in said particular vehicle.

This and other objects have been achieved according to the present invention by providing an actuation control apparatus capable of controlling a plurality of different passenger safety components in a motor vehicle and adaptable to specific ones of said passenger safety components which are actually present in the motor vehicle, comprising: at least one output stage which is adaptable to provide an appropriate electrical signal to any one of at least two different ones of said passenger safety components, said at least one output stage being adaptable via an electrical control signal to one of said at least two different passenger safety components which is actually present in the motor vehicle.

The at least one adaptable output stage present in the actuation control apparatus permits covering with only one output stage a series of equipment variants of passenger safety components. Preferably passenger safety components are associated with the adaptable output stages which in all probability are not installed together, such as deployable roll bars and rear seat airbags, and therefore are encountered alternatively.

Other objects, advantages and novel features of the present invention will become apparent from the following detailed description of the invention when considered in conjunction with the accompanying drawings.

BRIEF DESCRIPTION OF THE DRAWINGS

The sole drawing FIGURE is a schematic view of an apparatus for actuating a passenger safety system according to a preferred embodiment of the present invention.

DETAILED DESCRIPTION OF THE DRAWINGS

The drawing FIGURE shows a multicomponent passenger safety system comprising an actuation control apparatus 1 which controls a plurality of passenger safety components 3.1–3.3. The actuation control apparatus 1 is controlled at the input end by a deceleration sensor 2.

Depending on the equipment provided the actuation control apparatus 1 is additionally controlled by state factors (passenger parameters) in a passenger parameter indicator 6. A typical state factor is the state of the safety seat belt lock switch, which indicates whether the passenger is belted or not. Additional state factors such as the size or weight of the passenger, and the occupation of the front passenger seat by a passenger or a child's seat, can be used for the control.

Furthermore, the actuation control apparatus 1 can additionally be controlled in a known manner, as described above, by a state factor related to the crash parameter which indicates the actual or anticipated collision energy of the crash event.

The actuation control apparatus 1 itself comprises a signal evaluator with a programmable actuation logic unit 4 as well as several output stages 5.1–5.4, which in case of an actuation signal from the logic unit 4 send an actuation current to the particular passenger safety components 3.1–3.3 that are to be actuated. The output stages 5.1–5.4 must be adapted in their electrical/electronic performance to the particular passenger safety component (i.e., each of the output stages 5.1–5.4 must be adapted to provide an appropriate electrical signal to the corresponding actuator of the respective passenger safety component 3.1–3.3). In particular, the size of the output stages must be matched to the required actuation current or generally to the impedance of the actuator of the passenger safety component. As shown by way of example in the drawing FIGURE, the output fed by an output stage 5.4 is unoccupied because the corresponding passenger safety component is not built into the vehicle.

In the course of a one-time parametrization procedure, the actuation control apparatus 1 is set by a parametrization signal P to the equipment present in the vehicle, with regard to the sensing components 6 and 7 and the passenger safety components 3.1–3.3, as this is known in the state of the art and was described above. Unneeded output stages 5.4 are turned off.

According to the invention at least one adaptable output stage 5.3 is provided which by the presetting of an electrical control signal S can be adapted in its electrical/electronic performance to at least two different passenger safety components 3.3 or 3.4, e.g., a roll bar and a knee bag or back seat air bag. In the course of the parametrization procedure this control signal S is preset. Accordingly, the presetting occurs during the one-time parametrization procedure when the actuation control apparatus 1 is adapted to the specific passenger safety components present in the particular vehicle. Thus, the same actuation control apparatus 1 can be used for the purpose of actuating in one vehicle a deployable roll bar and in another vehicle an airbag, for example, a knee bag. For that purpose all that is necessary is to set the control signal S during the parametrization so that the adaptable output stage is adapted accordingly.

The adaptation of the adaptable output stage 5.3 is performed such that the output stage 5.3 is adapted to the electrical/electronic requirements of the passenger safety component 3.3 and/or 3.4 that are/is available for selection. Furthermore, the corresponding threshold above which the passenger safety component is to be actuated is set in the adaptable output stage 5.3. Adaptation to the electrical/electronic performances includes adaptation to the required actuation current and the ohmic resistance or generally to the impedance of the actuator of the passenger safety components 3.3 and 3.4. Moreover, the adaptation can also be made regarding the critical current of an overload relay or regarding the monitoring of a fault by adapting the test current or the tolerance ranges of factors to be monitored.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Actuation control apparatus for controlling a plurality of different passenger safety components in a motor vehicle, comprising:
   a signal evaluation stage receiving input signals from at least a deceleration sensor,
   a plurality of output stages receiving signals from said signal evaluation stage,
   each of said output stages being electrically coupled with a respective actuator of a respective one of said passenger safety components, each of said output stages being adapted to provide an appropriate electrical signal to said respective actuator,
   at least one of said output stages being adaptable to provide an appropriate electrical signal to any one of at least two different ones of said passenger safety components,
   said at least one adaptable output stage being presettable to a selected one of said at least two different passenger safety components arranged in a particular motor vehicle via an electrical control signal during a one-time parametrization procedure.

2. An apparatus according to claim 1, wherein said signal evaluation unit includes a programmable actuation logic unit.

3. An apparatus according to claim 1, wherein said appropriate electrical signal is adapted to an impedance of said respective actuator.

4. An apparatus according to claim 1, wherein said appropriate electrical signal is adapted to a required actuation current of said respective actuator.

5. Actuation control apparatus according to claim 1, wherein said appropriate electrical signal is adapted with regard to a critical current of an excess current safety relay.

6. Actuation control apparatus according to claim 1, wherein said appropriate electrical signal is adapted with regard to monitoring for error.

7. Method for adapting the actuation control apparatus according to claim 1 to the passenger safety system of a particular vehicle, wherein during the parametrization procedure, in which the actuation control apparatus is adapted to the specific ones of said passenger safety components present in said particular vehicle, the control signal is set in such a manner that the at least one adaptable output stage is adapted to the passenger safety component designed for adaptation and actually present in said particular vehicle.

8. Method according to claim 7, wherein during the adaptation a choice is made between a deployable roll bar and an airbag.

9. Actuation control apparatus capable of controlling a plurality of different passenger safety components in a motor vehicle and adaptable to specific ones of said passenger safety components which are actually present in the motor vehicle, comprising:
   at least one output stage which is adaptable to provide an appropriate electrical signal to any one of at least two different ones of said passenger safety components,
   said at least one output stage being adaptable via an electrical control signal to one of said at least two different passenger safety components which is actually present in the particular motor vehicle during a one-time parametrization procedure.

10. A method for adapting the actuation control apparatus of claim 9 to said specific ones of said passenger safety components which are actually present in the motor vehicle, comprising providing said electrical control signal to said at least one output stage.

11. A method for adapting the actuation control apparatus of claim 9 to said specific ones of said passenger safety components which are actually present in the motor vehicle, comprising providing said one-time initial parametrization signal to said at least one output stage.

* * * * *